United States Patent [19]

Lin et al.

[11] Patent Number: 5,199,979
[45] Date of Patent: Apr. 6, 1993

[54] UV RESISTANT, ABRASION RESISTANT COATINGS

[75] Inventors: Shaow B. Lin, Allison Park; Chia-Cheng Lin, Gibsonia; Robert M. Hunia, Kittanning; Gary J. Marietti, Cheswick, all of Pa.

[73] Assignee: PPG Industries, Inc., Pittsburgh, Pa.

[21] Appl. No.: 276,276

[22] Filed: Nov. 25, 1988

[51] Int. Cl.$^5$ ............................................. C09K 210/10
[52] U.S. Cl. ........................... 106/287.14; 106/287.17; 106/287.19; 106/287.18; 106/287.26
[58] Field of Search ............... 106/287.11, 287.12, 106/287.13, 287.14, 257.15, 257.16, 287.17, 287.19, 287.26, 287.28

[56] References Cited

U.S. PATENT DOCUMENTS

| | | | |
|---|---|---|---|
| 4,275,118 | 6/1981 | Baney et al. | 428/412 |
| 4,299,746 | 11/1981 | Frye | 260/29.2 M |
| 4,373,061 | 2/1983 | Ching | 524/767 |
| 4,374,674 | 2/1983 | Ashby et al. | 106/287.12 |
| 4,390,373 | 6/1983 | White et al. | 106/287.12 |
| 4,395,461 | 7/1983 | Ching | 428/412 |
| 4,405,679 | 9/1983 | Fujioka et al. | 428/216 |
| 4,442,168 | 4/1984 | White et al. | 428/331 |
| 4,477,499 | 10/1984 | Doin et al. | 427/412.1 |
| 4,500,669 | 2/1985 | Ashlock et al. | 524/440 |
| 4,552,936 | 11/1985 | Moore | 525/519 |
| 4,571,365 | 2/1986 | Ashlock et al. | 428/412 |
| 4,680,232 | 7/1987 | Factor et al. | 428/412 |

FOREIGN PATENT DOCUMENTS 85110293.9  5/1986  European Pat. Off. .

*Primary Examiner*—Mark L. Bell
*Assistant Examiner*—Alan Wright
*Attorney, Agent, or Firm*—Donna L. Seidel

[57] ABSTRACT

An ultraviolet radiation resistant coating is disclosed comprising a hydroxy-containing organic UV absorbing compound such as hydroxybenzotriazole which comprises hydrophilic moieties such as ethoxylate or propoxylate so that the compound is miscible and reactive with an inorganic oxide matrix formed by hydrolysis and condensation of an alkoxysilane and/or other metal alkoxide.

14 Claims, No Drawings

UV RESISTANT, ABRASION RESISTANT COATINGS

CROSS-REFERENCE TO RELATED APPLICATION

The present invention is related to the subject matter of U.S. application Ser. No. 07/273,442 filed on even date herewith by S. B. Lin et al entitled "UV Resistant Primer", now U.S. Pat. No. 5,045,396 the disclosure of which is incorporated herein by reference.

FIELD OF THE INVENTION

The present invention relates generally to protective coatings for plastics such as polycarbonate, and more particularly to coatings which protect the underlying substrate from damage caused by exposure to ultraviolet radiation.

BACKGROUND OF THE INVENTION

U.S. Pat. No. 4,275,118 to Baney et al discloses a coating composition comprising an acidic dispersion of colloidal titania, colloidal silica and hydroxylated silsesquioxane in an alcohol-water medium which produces a hard, abrasion-resistant coating when cured on a plastic surface such as polycarbonate.

U.S. Pat. No. 4,299,746 to Frye discloses an improved silicone resin abrasion resistant coating composition prepared by hydrolyzing an alkyltrialkoxysilane in an aqueous colloidal silica dispersion and adding thereto a small amount of an ultraviolet light absorbing compound such as 2,4-dihydroxybenzophenone to the hydrolysis product.

U.S. Pat. Nos. 4,390,373 and 4,442,168 to White et al disclose a cured, transparent, abrasion resistant coating composition comprising an effective abrasion resisting amount of a colloidal dispersion containing colloidal antimony oxide and colloidal silica in a weight ratio of less than or equal to about 30:70 in a water-alcohol solution of the partial condensate of R (Si(OH)$_3$) wherein R is an organic radical.

U.S. Pat. No. 4,395,461 to Ching discloses a method for improving the weatherability of a polycarbonate substrate by initially treating the surface of the polycarbonate substrate with a solution of a hydrolyzed silylated organic UV screen followed by the application of a curable silicone hardcoat composition onto the treated substrate.

U.S. Pat. No. 4,405,679 to Fujioka et al discloses a coated shaped article of a polycarbonate type resin of improved abrasion resistance comprising a shaped polycarbonate substrate, an undercoat applied and cured on the substrate, and an overcoat applied and cured on the undercoat comprising a hydrolyzate of an epoxy-containing silicon compound, at least one member of the group of hydrolyzates of organic silicon compounds, colloidal silica and organic titania compounds, and a curing catalyst.

U.S. Pat. No. 4,477,499 to Doin et al discloses ultraviolet radiation resistant silicone resin coatings having improved thermoformability and shortened required aging achieved by the addition of a Lewis acid compound to the coating composition.

U.S. Pat. Nos. 4,500,669 and 4,571,365 to Ashlock et al disclose transparent, abrasion resistant coating compositions comprising a colloidal dispersion of a water insoluble dispersant in a water-alcohol solution of the partial condensate of silanol wherein the dispersant comprises metals, alloys, salts, oxides and hydroxides thereof.

U.S. Pat. No. 4,552,936 to Moore discloses a protective coating composition containing a polycaprolactone polyol and an aminoplast derivative applied to a thermoplastic substrate to produce a thermoformable article having abrasion resistance, solvent resistance and weatherability.

European Patent Application No. 851102939 published May 2, 1986 entitled "Carbon-Containing Monolithic Glasses Prepared by a Sol-Gel Process" by Baney et al of Dow Corning Corporation discloses an intermediate which comprises a dispersion of a colloidal metal oxide in a water-alcohol solution of the partial condensate of a silanol having the formula RSi(OH)$_3$, wherein the metal oxide is $ZrO_2$, $SnO_2$, $ZrSiO_4$, $B_2O_3$ or $La_2O_3$.

Optical quality abrasion resistant coated plastic materials generally require a coating that protects the substrate from the damaging effects of ultraviolet (UV) radiation. Protection from ultraviolet radiation is especially important for polycarbonate, since hydrolytic degradation is apparently accelerated by UV exposure. Conventional UV stabilizers do not impart sufficient protective capacity to abrasion resistant coatings, as sufficient amounts of most typical organic UV absorbers cannot be added to water/alcohol based sol-gel type abrasion resistant coating compositions due to limited solubility and further without adversely affecting hardness and adhesion of the coating. Moreover, typical UV absorbers may gradually become deactivated after prolonged exposure, and also may gradually be leached from the composition.

SUMMARY OF THE INVENTION

The present invention provides protection for underlying plastic substrates such as polycarbonate from damaging ultraviolet radiation by means of transparent coatings containing ultraviolet absorbing organic compounds which contain hydrophilic moieties with terminal hydroxyl groups capable of reacting with silanol groups in partially hydrolyzed sols of alkoxides of silicon and/or other metals which hydrolyze and polymerize by condensation to form a film which provides abrasion resistance to the plastic substrate surface. The hydrophilic-modified hydroxybenzotriazole and hydroxybenzophenone derivatives of the present invention are compatible with alcoholic/aqueous sol-gel compositions and processes, and provide UV protection without compromising abrasion resistance of the inorganic oxide coating.

DESCRIPTION OF THE PREFERRED EMBODIMENT

Coatings that protect plastic substrates such as polycarbonate from damage caused by ultraviolet radiation are formed from sols containing network-forming metal alkoxides such as alkoxysilanes and other metal alkoxides. The alkoxysilane may be an organoalkoxysilane, such as an alkylalkoxysilane or other organofunctional alkoxysilane. The alkoxide may contain alkyl or aryl groups and may be in dimer or higher condensed form so long as hydrolyzable alkoxide groups remain. An ultraviolet radiation absorbing organic compound which contains hydroxyl groups capable of reacting with silanol groups is added to the partially hydrolyzed sol. Hydrolysis and condensation polymerization occur in situ. Alternatively, the alkoxide may be partially or fully hydrolyzed, and condensed to some extent prior to combination with the hydroxyl-containing organic UV absorber, preferably hydroxybenzotriazole.

Conventional organic ultraviolet absorbers such as benzophenone and benzotriazole and alkyl derivatives thereof show limited solubility in alcohol-water based inorganic sol-gel type abrasion resistant coatings. Also, due to the lack of covalent bonding between a typical UV absorber and the inorganic coating matrix, the organic UV absorber bleaches out over a short period of service.

In accordance with the present invention, hydroxybenzotriazole and hydroxybenzophenone UV absorbers are modified with hydrophilic chain extensions having terminal hydroxy groups for condensation reaction with inorganic sols to become the part of the polymer oxide network structure upon curing. The presence of ethoxy and/or propoxy hydrophilic moieties provides the organic ultraviolet absorber in liquid form, and improves its miscibility with the inorganic sols as well. A polyethylene glycol substituted hydroxybenzotriazole of the following formula is a preferred UV absorber in accordance with the present invention.

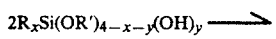
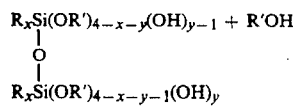

or

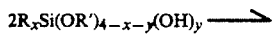
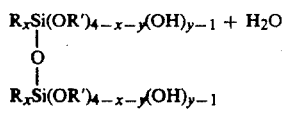

Further hydrolysis and condensation follow, as well as condensation with the hydrophilic hydroxybenzotriazole.

The pH and/or degree of condensation of the alkoxides may be adjusted, if necessary, to prevent haze or precipitation upon mixing with the organic ultraviolet

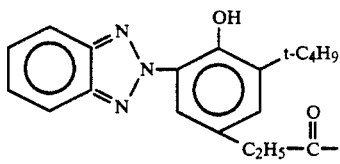
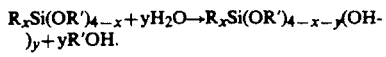

A suitable composition is available from Ciba-Geigy as Tinuvin 1130.

The resulting composition may be used as a coating composition for either a primer or a protective overcoat on a substrate or coated substrate. In an alternative embodiment, the composition may be added to other coating compositions, such as abrasion resistant coating compositions, to increase their resistance to ultraviolet radiation. In either case, the coating compositions may be applied by any conventional technique, such as spraying, dipping or flow coating. The composition dries and cures to form a uniform durable coating with good adhesion to plastic substrates such as polycarbonate. The coating protects the substrate from ultraviolet radiation by providing strong and broad absorption in the 240 to 380 nanometer range.

In a preferred embodiment of the present invention, an alkoxide is partially hydrolyzed before adding an ultraviolet absorbing organic compound containing hydrophilic extensions with terminal hydroxyl groups capable of reacting with silanol groups. Preferably, the alkoxide is an alkoxysilane of the general formula $R_xSi(OR')_{4-x}$ wherein R is an organic radical, R' is selected from the group consisting of low molecular weight alkyl radicals, and x is less than 4 and may be zero. The organic radical of R is preferably alkyl, vinyl, methoxyethyl, phenyl, γ-glycidoxypropyl, or γ-methacryloxypropyl. The alkoxide hydrolyzes according to the general reaction $$R_xSi(OR')_{4-x} + yH_2O \rightarrow R_xSi(OR')_{4-x-y}(OH)_y + yR'OH.$$

Condensation of the hydrolyzed alkoxide proceeds according to the general reactions absorber, preferably ethoxylated or propoxylated hydroxybenzotriazoles, and to facilitate the condensation reaction of the terminal hydroxy groups on the hydrophilic extensions of the organic UV absorber and the partially hydrolyzed metal alkoxide. The sol preferably comprises about 0.5 to 5.0 percent by solid weight of the hydrophilic hydroxybenzotriazole. Alkoxides of titanium and/or zirconium may also be included in compositions of the present invention, as well as colloidal silica for abrasion resistance. The ultraviolet radiation protection provided by the hydrophilic hydroxybenzotriazole containing coating of the present invention may be determined by measuring the UV absorbance spectrum of the coating applied on a quartz substrate.

In order to coat polycarbonate substrates with abrasion resistant sol-gel compositions of the present invention, preferably an acrylic primer solution is prepared as follows. A solution is prepared from 5 grams of methylmethacrylate/ethylmethacrylate copolymer of 60/40 ratio in warm solvent mixture of 65 grams of propylene glycol methyl ether (or Dowanol PM of Dow Chemicals) and 20 grams of diacetone alcohol. A solution of 0.50 gram Tinuvin 900 and 0.50 gram Tinuvin 1130 UV absorbers in 5 grams of toluene is added to the above resin solution, as taught in copending application Ser. No. 07/273,442 filed on even date herewith by Lin et al entitled "UV Resistant Primer", the disclosure of which is incorporated herein by reference.

The present invention will be further understood from the description of specific examples which follow.

EXAMPLE I

A silane/zirconia coating which is both abrasion-resistant and ultraviolet radiation resistant is prepared as follows. An organoalkoxysilane composition is prepared by combining 25 grams of methyl triethoxysilane and 50 grams of γ-propylacryloxy trimethoxysilane. To the organoalkoxysilane is added 1.8 grams of ethoxylated hydroxybenzotriazole (Tinuvin 1130 from Ciba-Geigy). This composition is stirred for 10 minutes before adding 30 grams of 2-propanol, 8 grams of deionized water and 5 drops of hydrochloric acid to hydrolyze the organoalkoxysilane. The hydrolyzed organoalkoxysilane composition is clear. To the hydrolyzed organoalkoxysilane is added 30 grams of zirconium n-propoxide. After stirring for 20 minutes, 20 grams of deionized water is added to complete hydrolysis, along with 6 grams of 10 percent ammonium hydroxide and 10 grams of diacetone alcohol containing 1.2 grams of additional Tinuvin 1130. The mixture is stirred at ambient temperature for two hours. Finally, 0.5 gram of azoisobutylnitrile and 5 grams of diacetone alcohol are added.

For comparison, when hydroxybenzophenone ultraviolet absorbers were added to such sol-gel abrasion-resistant coating compositions, a color change occurs, followed by formation of precipitate.

EXAMPLE II

Organic UV absorbers having improved miscibility with alcohol-water based inorganic sols can be prepared by incorporation of a water-miscible ethoxylated or propoxylated chain with terminal hydroxy groups. Hydrophilic substituted hydroxybenzophenones are prepared e.g. by dissolving 21.4 grams of 2,4-dihydroxybenzophenone (0.10 mole) and a trace amount of potassium hydroxide in 100 grams of dioxane in a reaction vessel. A solution of 23.2 grams of propylene oxide in 35 grams of dioxane is slowly added to the dioxane solution at 20° C. for 30 minutes, then raised to 35° C. for another 30 minutes. The reaction is quenched with about 5 grams of water in dioxane. The reaction product is collected by adding a large excess of water to precipitate the reaction product from the solvent. The miscibility of the substituted product depends on the length of the propoxylation which, in turn, is determined by the molar ratio of propylene oxide to benzophenone.

EXAMPLES III AND IV

A reaction mixture is prepared comprising 100 grams of methyltriethoxysilane (A-162 from Union Carbide), 10 grams of dimethyldiethoxysilane, 60 grams of silica sol (Ludox LS from du Pont), and 3.6 grams of acetic acid. The mixture is allowed to react at room temperature. After about 1 day of reaction, the mixture is diluted with 80 grams of isobutanol and centrifuged. Three fractions of the mixture are taken, and to each respectively is added 0, 1.5% and 2% based on the gel weight of β-[3-(2H-benzotriazole-2-yl-)4-hydroxy-5-t-butylphenyl-] propionic acid, methyl ester of polyethylene glycol of molecular weight 300. The reaction continues to react at room temperature for 3 days.

Primed polycarbonate substrates are dipped into the above solutions for about 3 minutes, then air-dried for 15 minutes and cured 1 hour at 120° C. The UV resistance is determined by the intensity of UV absorption through a quartz substrate. The adhesion property of the coating is determined, per ASTM D-3359-87, by using a Gardner 11-tooth scriber to cross-scribe in X-direction, then tape is pulled three times over the 100 squares. Adhesion is called excellent when no square is missing.

ASTM F735-81 is used to determine the Bayer abrasion resistance of the coating. A 4"×4" coated polycarbonate is subjected to an oscillating silica sand box for 300 cycles of abrasion in 2 minutes. The change in the percentage of haze which is measured by a hazemeter (Hazegard system of Pacific Scientific) is reported. Typically, uncoated polycarbonate has a 55-60% haze increase in this test.

The UV resistance of the coating itself as well as its ability to protect an underlying substrate from damage by UV is evaluated by submitting the coated polycarbonates to an accelerated Q-UV chamber equipped with fluorescent tubes (B313 nanometers) manufactured by Q-panel Corporation according to the testing method described in ASTM G53-77. The chamber is programmed for an 8 hour light cycle at 70° C., followed by a 4 hour, 100% condensing cycle at 50° C. The appearance of the coating is inspected, and the discoloration reported in terms of the yellowness index (per ASTM E308-85, 1931 CIE, Illuminant C) using a UV/VIS spectrophotometer. Uncoated polycarbonate typically reaches a value of 10 soon after 100 hours of exposure. The following properties are observed:

| % UVA | Adhesion to Polycarbonate | UV Absorb. | Bayer Abrasion | Appearance After 700 hours | Q-UVB YID |
|---|---|---|---|---|---|
| 0 (Control) | excellent | 2.40 | 9.6 | Slight cracks | 3.8 |
| 1.5 | excellent | 2.80 | 8.8 | O.K. | 1.4 |
| 2.0 | excellent | 2.90 | 10.6 | O.K. | 1.3 |

EXAMPLE V

A reaction mixture is prepared comprising 80 grams of methyltrimethoxysilane and 8 grams of dimethyldiethoxysilane, to which is added a solution prepared by dissolving 1.5 grams of polyvinylpyrrolidone in 55 grams of methanol and 55 grams of deionized water. After adding 4 grams of acetic acid, the mixture is stirred at room temperature for 2 hours. To the mixture is then added 2 grams of Tinuvin 1130, along with 50 grams of diacetone alcohol and 25 grams of isopropanol, and then 0.2 grams of potassium acetate. The room temperature stirring is continued for three days.

Cleaned polycarbonate substrates are primed and then dipped in the above coating composition solution for 3 minutes, air-dired for 15 minutes, then cured for 1 hour at 120° C. An optically clear, UV resistant abrasion resistant coating is obtained.

EXAMPLE VI

A solution is prepared by dissolving 1.5 grams of polyvinylpyrrolidone in 55 grams of methanol and 55 grams of deionized water, then adding 4 grams of acetic acid. To the solution are added 80 grams of methyltrimethoxysilane, 8 grams of dimethyldiethoxysilane and 3 grams of the hydroxybenzophenone propoxylate derivative of Example II. The reaction mixture is stirred at room temperature for 2 hours, then 50 grams of 2-propanol, 25 grams of diacetone alcohol and 0.2 grams of potassium acetate are added. The room temperature reaction continues for three days.

Clean polycarbonate substrates are primed then flow coated with the above coating composition, air dried and cured at 120° C. for 1 hour. An optically clear, abrasion resistant coating is obtained.

The above examples are offered to illustrate the present invention. Various hydrolyzable alkoxides and hydrophilic hydroxybenzophenone and/or hydroxybenzotriazole compositions may be combined in a wide range of proportions and concentrations, so long as there is sufficient alkoxide to form an oxide network and sufficient hydrophilic UV absorber to provide desired improvement in ultraviolet radiation resistance, as measured by the UV absorbance spectrum of the coating on a quartz substrate, without compromising the abrasion resistance of the coating. These coatings are useful on a variety of substrates in accordance with the present invention, the scope of which is defined by the following claims.

We claim:

1. An optically transparent coating composition for protecting a substrate from ultraviolet radiation consisting essentially of:
   a. a partially hydrolyzed alkoxide of the general formula $R_xM(OR')_{z-x}$ wherein R is an organic radical, M is selected from the group consisting of silicon, aluminum, titanium, zirconium, cerium and mixtures thereof, R' is a low molecular weight alkyl radical, z is the valence of M and x is less than z and may be zero; and
   b. a hydroxy-containing organic compound which absorbs ultraviolet radiation and which comprises hydrophilic moieties capable of reacting with said partially hydrolyzed alkoxide.

2. A composition according to claim 1, wherein said alkoxide comprises the general formula $R_xSi(OR')_{4-x}$ and R' is selected from the group consisting of methyl, ethyl, propyl, and butyl.

3. A composition according to claim 2 wherein R is selected from the group consisting of alkyl, vinyl, phenyl, methoxyethyl, γ-glycidoxypropyl and γ-methacryloxypropyl, and x is 1.

4. A composition according to claim 3, wherein said alkoxide comprises methyl triethoxysilane.

5. A composition according to claim 3, wherein said alkoxide comprises γ-glycidoxypropyl trimethoxysilane.

6. A composition according to claim 1, wherein said hydroxy-containing organic compound comprises a hydroxybenzotriazole with hydrophilic moieties selected from the group consisting of ethoxylate and propoxylate.

7. A composition according to claim 6, wherein said hydroxy-containing organic compound comprises a hydroxybenzophenone with hydrophilic moieties selected from the group consisting of ethoxylate and propoxylate.

8. A method of preparing an optically transparent ultraviolet resistant coating composition comprising the steps of:
   a. at least partially hydrolyzing an alkoxide of the general formula $R_xM(OR')_{z-x}$ wherein R is an organic radical, M is selected from the group consisting of silicon, aluminum, titanium, zirconium, cerium and mixtures thereof, R' is a low molecular weight alkyl radical, z is the valence of M and x is less than z and may be zero; and
   b. adding to said at least partially hydrolyzed alkoxide a hydroxy-containing organic compound which absorbs ultraviolet radiation and which comprises hydrophilic moieties.

9. A method according to claim 8, wherein said alkoxide comprises the general formula $R_xSi(OR')_{4-x}$ and R' is selected from the group consisting of methyl, ethyl, propyl and butyl.

10. A method according to claim 9, wherein R is selected from the group consisting of alkyl, vinyl, phenyl, methoxyethyl, γ-glycidoxypropyl and γ-methacryloxypropyl, and x is 1.

11. A method according to claim 10, wherein said alkoxide comprises methyl triethoxysilane.

12. A method according to claim 11, wherein said alkoxide comprises γ-glycidoxypropyl trimethoxysilane.

13. A method according to claim 8, wherein said hydroxy-containing organic compound comprises a hydroxybenzotriazole with hydrophilic moieties selected from the group consisting of ethoxylate and propoxylate.

14. A method according to claim 8, wherein said hydroxy-containing compound comprises a hydroxybenzophenone with hydrophilic moieties selected from the group consisting of ethoxylate and propoxylate.

* * * * *